UNITED STATES PATENT OFFICE.

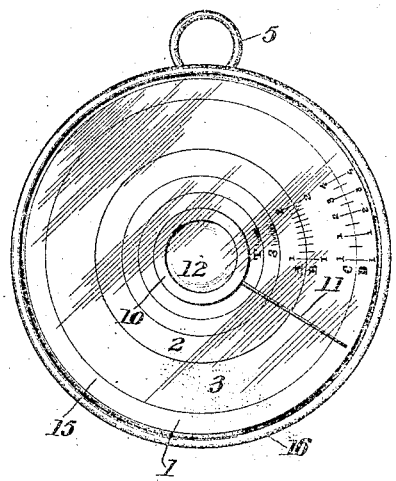

DAVID W. BRUNTON, OF DENVER, COLORADO.

CIRCULAR SLIDE-RULE.

1,056,775. Specification of Letters Patent. Patented Mar. 25, 1913.

Application filed November 13, 1912. Serial No. 731,217.

*To all whom it may concern:*

Be it known that I, DAVID W. BRUNTON, a citizen of the United States, residing at Denver, in the county of Denver and State of Colorado, have invented a certain new and useful Improvement in Circular Slide-Rules, of which the following is a full, clear, and exact description.

The object of this invention is to provide a convenient and efficient form of calculator, in the nature of a circular slide rule, by means of which mathematical problems may be readily solved by the mechanical use of a combination of logarithmic scales.

The ordinary or Mannheim slide rule has proven itself to be a most useful instrument for many of the calculations required in engineering and mechanical work, but its length makes it exceedingly inconvenient for pocket use.

Numerous attempts have been made to manufacture a circular slide rule which would be as convenient to use and at the same time easily carried in the pocket. Many of these circular slide rules are marvels of ingenuity and good workmanship, but all of them with which I am familiar lack one of the most useful features of the linear slide rule, namely, the combination of the two sets of logarithmic graduations, one double the scale of the other, whereby, for example, the square root may be extracted or a number squared by merely jumping from one scale to the other.

Most of the calculations which engineers and mechanics have to make, involve at some stage the necessity for obtaining the area of a circle when its radius, its diameter, or its circumference is known. This operation is performed with such wonderful celerity on the ordinary slide rule that all of the circular slide rules, no matter how ingeniously constructed, have failed to come into very general use, and this because they carry certain scales which while extremely useful for many purposes, are not as convenient for calculations involving the extraction of the square root or the squaring of numbers as the linear slide rule.

In using the ordinary linear slide rule, calculations are nearly always made on the A and B double scales instead of on the C and D single scales, because on the latter the result is very apt to run off the scale.

By the present invention it is sought to combine all of the advantages of the linear slide rule without its inconvenient length, and the compactness and portability of the circular slide rule, with an endless runner.

The invention consists of a circular slide rule, comprising a two-circle frame having a runner mounted in and between its parts, and a central cursor, containing also by preference in its mounting a magnifying glass, the frame parts and the runner being suitably graduated, and the face covered by a glass, as I will proceed now more particularly to explain and then claim.

In the accompanying drawings, illustrating the invention, in the several figures of which like parts are similarly designated, Figure 1 is a top plan view and Fig. 2 is a bottom plan view of a preferred construction. Fig. 3 is a cross-section on a larger scale illustrating the structural details of my circular slide rule.

It is to be noted that the graduations on Fig. 1 are merely indicative or conventional representations of the A—B and C—D as well as the sines and tangents scales that are to be used upon the instrument.

The frame comprises an outer circular plate 1 and an inner circular plate 2 in concentric arrangement, and these two parts are spaced apart to receive a runner 3, and are connected by one or more bridges 4 which span the runner space or runway. A ring 5 may be applied to the bridge for convenience in carrying the instrument. The adjacent edges of the plates 1 and 2 are rabbeted to receive the runner 3 which is complementally rabbeted. This runner is made as an annulus and fitted between the plates 1 and 2 and lies in the same plane. An annular back-plate 6 is screwed or otherwise fitted to the back of the runner and it is of a width sufficient to overlap the adjacent edges of the frame parts 1 and 2, so as to hold the runner in place in the frame. This back-plate 6 is provided with a depending flange or other rearward extension 7, preferably provided with a knurled or milled edge 8 or other finger-hold to enable the operator to turn the runner in the runway afforded by the rabbeted edges of the frame plates 1 and 2. Within a central hole in the frame is located a cylindrical housing or casing 9 having a face flange 10 which overlaps the adjacent edge of plate 2 to hold said casing in position. To this flange 10 is affixed a cursor 11 overlying the face of the instrument, and within the casing is suitably mounted a magnifying glass 12. The casing 9 is provided with an exteriorly arranged finger-hold 13, here shown as a knurled ring, by which it may be turned, and which abuts against the back of the frame part or plate 2 to hold the casing in position in the frame.

The outer plate 1 may have a raised rim 14 on a level with the flange 10 and these two support a glass or other transparent face plate 15, which may be engaged by a bezel 16 which in turn engages the outer plate 1. This elevated face-plate leaves a space between itself and the frame parts and runner for the travel of the cursor.

In the preferred form, the instrument will be supplied with the double sets of logarithmic scales commonly known as the A—B and C—D scales exactly as used on the ordinary Mannheim linear slide rule. The combination of two sets of graduations, one double the scale of the other, is extremely useful in making calculations where it is necessary at some stage of the process to extract the square root, since it is only necessary to jump from one scale to the other to extract the square root, or reverse the reading to square a number. So far as I am aware, the circular slide rules have carried only one set of scales and were incapable of extracting the square root or squaring a number in this manner.

In using the ordinary linear slide rule, calculations are nearly always made on the A—B double scales instead of on the C—D single scales, and for the reason that on the latter the result is very apt to run off the scale. In a circular slide rule, such as mine, the runner being endless, the result never runs off, and consequently the ordinary operations of multiplication and division may be more conveniently performed on the single scales than on the double scales, and as a result, I am enabled to make a small and convenient pocket instrument of about three inches in diameter, with which calculations may be made with the same accuracy as is ordinarily obtained upon a fifteen inch linear rule.

It is to be noted that my rule carries an endless runner on an entirely unobstructed face, and hence the instrument really combines all of the advantages of both circular and linear rules.

The circular housing carrying the cursor is utilized to receive the magnifying glass, which will be found convenient in reading graduations on scales, surveying instruments and for examining mineral and other specimens. As shown, the magnifying glass is held between the inner projection of the flange 10 and a suitable retaining ring 17, although other means may be employed to hold the glass in place.

As indicated in Fig. 3, the scales may be applied to the instrument by means of added material 18, such as paper, celluloid, or other suitable vehicle, although the scales may be cut in the metal of the parts, or otherwise suitably applied to the instrument.

While the circular finger-holds are preferred, it is to be understood that the invention is not limited to the use of any particular kind of means for turning the runner or the cursor holder.

What I claim is:—

1. A circular slide rule, having a two-part frame, the parts of which are concentric and separated by a runway, and one or more bridges spanning the runway and rigidly connecting the parts, and an endless runner mounted in said runway and provided with a finger-hold.

2. A circular slide rule, having a frame made with two concentric parts which are separated by a runway, and one or more bridges spanning the runway and rigidly connecting the parts, an endless runner mounted in said runway and provided with a finger-hold, a housing centrally arranged within the frame and provided with a finger-hold, and a cursor mounted on said housing.

3. A circular slide rule, having a frame comprising two circular plates separated by a runway, and one or more bridges spanning the runway and rigidly connecting said plates, an endless runner mounted in said runway and provided with a finger-hold, a housing centrally arranged within the frame and provided with a finger-hold, a cursor carried by said housing, the faces of the frame plates and runner being in the same plane and provided with appropriate logarithmic scales, and a face cover mounted over and inclosing the scales.

4. A circular slide rule, having a frame provided with concentric plates, the adjacent edges of which are rabbeted, a circular runner mounted upon said rabbeted edges, and a back-plate provided with a finger-hold and attached to the back of the runner with its edges overlapping the adjacent edges of the frame plates.

5. A circular slide rule, having a frame made with a central opening provided with a flanged housing, the flange overlying the edge of the opening and provided with a cursor, and said housing extending back of the frame and provided with a finger-hold which additionally holds the housing in place.

6. A circular slide rule, composed of a frame having two concentric plates spaced apart and united by a bridge or bridges, a runner mounted in the space between the plates and provided with means to turn it, and a cursor mounted centrally within the frame, the frame plates and runner carrying one single set and one double set of logarithmic scales arranged so as to permit the automatic extraction of square roots, squaring numbers as well as for other purposes.

7. A circular slide rule, having a two-part frame, the parts of which are concentric and separated by a runway and bridged together over the runway, and an endless runner mounted in said runway and provided with a depending flange forming a finger-hold for operating the runner.

8. A circular slide rule, having a frame made with two concentric parts separated by a runway and bridged together over the runway, an endless runner mounted in said runway and provided with a depending flange forming a finger-hold for operating said runner, a housing centrally arranged within the frame and provided with a depending flange constituting a finger-hold for rotating it within the frame, and a cursor mounted on and turning with said housing.

In testimony whereof I have hereunto set my hand this 9th day of Nov. A. D. 1912.

DAVID W. BRUNTON.

Witnesses:
ROBERT K. MCCORMICK,
H. ELLIS SEALING.